(12) United States Patent
Mohr

(10) Patent No.: US 12,664,852 B2
(45) Date of Patent: Jun. 23, 2026

(54) DEVICE AND METHOD FOR DETECTING A CONSUMPTION VARIABLE

(71) Applicant: TECALEMIT GMBH & CO. KG, Flensburg (DE)

(72) Inventor: Jörg Mohr, Süderbrarup (DE)

(73) Assignee: TECALEMIT GMBH & CO. KG, Flensburg (DE)

( * ) Notice: Subject to any disclaimer, the term of this patent is extended or adjusted under 35 U.S.C. 154(b) by 0 days.

(21) Appl. No.: 18/723,917

(22) PCT Filed: Jan. 18, 2022

(86) PCT No.: PCT/EP2022/050991
§ 371 (c)(1),
(2) Date: Jun. 25, 2024

(87) PCT Pub. No.: WO2023/138751
PCT Pub. Date: Jul. 27, 2023

(65) Prior Publication Data
US 2025/0087042 A1     Mar. 13, 2025

(51) Int. Cl.
*G07F 13/02*         (2006.01)
*G06Q 20/14*        (2012.01)
(Continued)

(52) U.S. Cl.
CPC ......... *G07F 13/025* (2013.01); *G06Q 20/145* (2013.01); *G06Q 20/4014* (2013.01);
(Continued)

(58) Field of Classification Search
CPC ............... G07F 13/025; G06Q 20/145; G06Q 20/4014; H04Q 9/00; H04Q 2209/47; H04Q 2209/60
(Continued)

(56) References Cited

U.S. PATENT DOCUMENTS

2017/0211955 A1     7/2017   Mohr et al.
2018/0298798 A1*  10/2018   Dikeman ............... F01M 11/12
(Continued)

FOREIGN PATENT DOCUMENTS

EP          3272705 A1     1/2018
EP          3789776 A1     3/2021

OTHER PUBLICATIONS

"Electric water heater energy consumption determination using outlet temperature and volumetric estimation" Published by IEEE (Year: 2015).*

(Continued)

*Primary Examiner* — Zeina Elchanti
(74) *Attorney, Agent, or Firm* — Ladas & Parry LLP; Malcolm J. MacDonald, Esq.

(57)          ABSTRACT

The invention relates to a device (10) and method for recording a consumption variable supplied to a point of consumption. The device comprises a metering module (12) for recording the consumption variable, a first communication module (16) which is designed to communicate, preferably wirelessly, with a remote central collection unit (32) via a first communication network (30) and to transmit at least consumption-related data to the central collection unit (32); a data processing module (14) which is designed to transmit and receive radio signals via the first communication module (16) and to receive and analyze a signal generated by the metering module (12); a power supply module (24) which is designed to supply the metering module (12), the first communication module (16) and the data processing module (14) with current; and a battery (26) which is arranged such that it supplies the power supply module (24) with power. To simplify operation, it is provided that the device (10) has a second communication module (18) which is coupled to the data processing module (14) and is designed to create a wireless communication (Continued)

Figure 1:
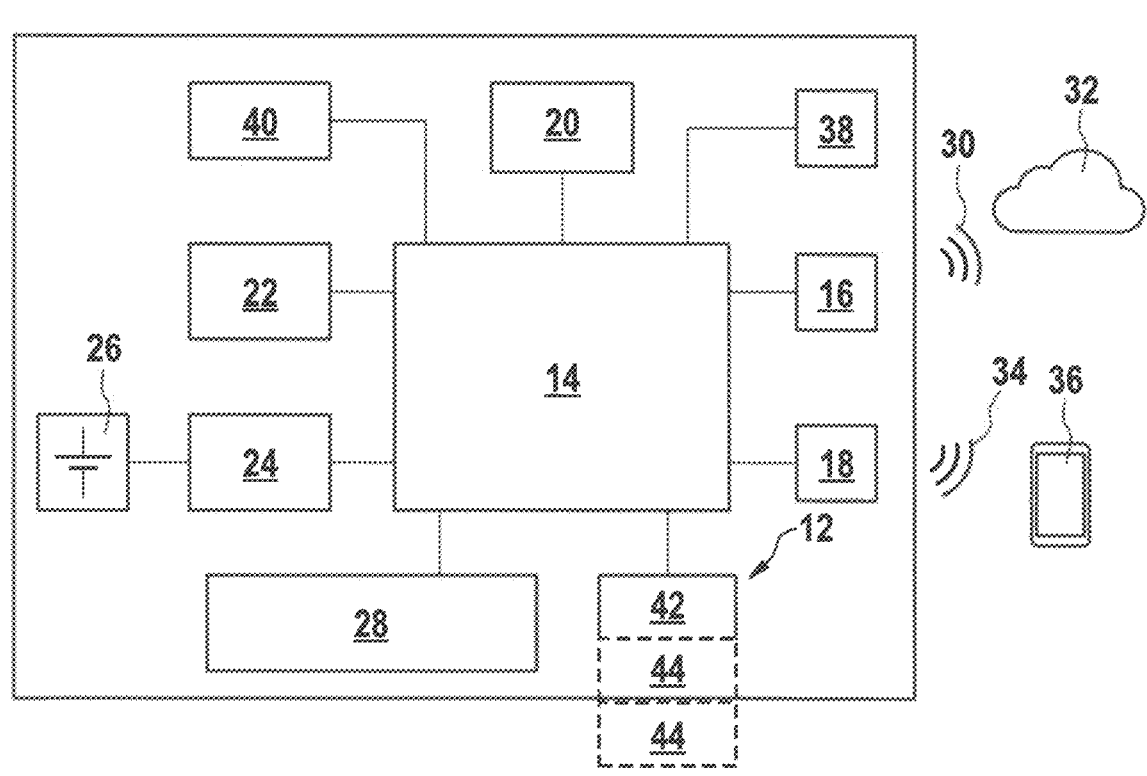

connection (34) between the data processing module (14) and a user identification means (36) of a user and to receive user data of said user, wherein the device (10) has an authentication module (22) coupled to the data processing module (14) and designed to verify the user data and assign it to an account of the user, and wherein the data processing module (14) is designed to assign the consumption variable provided to the user and recorded by the metering module (12) to the account of the user and to transmit it to the central collection unit (32) via the first communication module (16).

13 Claims, 2 Drawing Sheets

(51) Int. Cl.
   *G06Q 20/40*      (2012.01)
   *H04Q 9/00*       (2006.01)

(52) U.S. Cl.
   CPC ........... *H04Q 9/00* (2013.01); *H04Q 2209/47* (2013.01); *H04Q 2209/60* (2013.01)

(58) Field of Classification Search
   USPC ....................................................... 705/413
   See application file for complete search history.

(56)              References Cited

U.S. PATENT DOCUMENTS

| | | | |
|---|---|---|---|
| 2019/0106319 A1* | 4/2019 | Kahler .................... | B67D 7/34 |
| 2021/0038001 A1 | 2/2021 | Nieraad et al. | |
| 2021/0404907 A1* | 12/2021 | Fung-A-Wing ......... | G01M 3/16 |

OTHER PUBLICATIONS

International Search Report, dated Sep. 14, 2022, corresponding to International Application No. PCT/EP2022/050991.

* cited by examiner

DEVICE AND METHOD FOR DETECTING A CONSUMPTION VARIABLE

The invention relates to a device for recording a consumption variable according to the preamble of claim 1, and to a method for recording a consumption variable provided at/delivered to a consumption point according to the preamble of claim 13.

A device of the type stated at the outset is known from EP 3 789 776 A1 in the form of a consumption meter. The consumption meter is designed to measure a quantity and to transmit consumption-related data to a central meter reading system. The consumption meter comprises a radio transmitter and radio receiver, as well as a power supply circuit with its own battery which is designed to supply the radio receiver with power. A control unit is configured to analyze a radio signal received by the radio receiver. An interaction between the consumption meter and a user is not provided.

EP 3 272 705 A1 relates to a system and method for controlling the dispensing of a fluid by a dispensing device. The system comprises one or more dispensing units as well as one or more mobile devices, such as cell phones, each operated by a vehicle user. A central processing unit is also provided. The mobile devices are in a communication connection to the central processing unit via a communication network. The dispensing units and the mobile devices each comprise wireless short-range communication modules designed to establish a short-range communication connection between the dispensing units and the mobile devices. The mobile devices are designed to transmit the data received from the dispensing units to the central processing unit. Direct communication between the dispensing unit and the central processing unit is not provided. Volumetric flow measurement and data processing and transmission are performed by individual, spatially separated and cable-connected components, i.e. by a volumetric flow meter on one hand and by a automatic fuel terminal with data processing and transmission on the other.

EP 3 196 600 A1 relates to a flow meter for liquids, comprising a meter housing and a sensor housing couplable to said meter housing and at least partially enclosing the latter. The meter housing comprises a first and a second connection as well as a metering element which is rotatably mounted inside the meter housing and has at least one pickup element. At least one sensor responding to the pickup element is arranged in the sensor housing to determine a liquid quantity flowing through the meter housing. The meter housing and the sensor housing are designed as units separate from one another.

Based on this, the object underlying the present invention is to develop a device and method for recording a consumption quantity of the type mentioned at the outset such that user-specific dispensing and measurement of a consumption quantity is simplified. The device should also be easy to operate and flexible to use.

This object is solved in accordance with the invention by a device having the features of claim 1.

Unlike devices according to the prior art, the device in accordance with the invention has two communication modules, i.e. a first communication module designed to communicate preferably wirelessly with a remote central collection unit via a first communication connection, and a second communication module designed to establish, via a second communication connection in the form of wireless communication, a communication connection to a user identification means of a user in order to receive user data of said user.

It is ensured by an authentication module implemented in the device that the user data of the user is verified and may be assigned to an account of the user.

In addition, the data processing module is designed such that a consumption variable dispensed to the user after authentication and metered by the metering module is assigned to the account of the user and may be transmitted to the central collection unit via the first communication module.

Particularly preferably, the first communication module is designed according to the LPWA (Low Power Wide Area) standard and permits in particular communication via NB-IoT (Narrowband Internet of Things) or LTE-M (Long Term Evolution for Machines) standards. Covering of long ranges with a low power consumption of the modules is achieved using the LPWA standard. In particular, battery-operated sensors may be used. The operating costs are also low.

The second communication module is preferably designed as an NFC (Near Field Communication) module, an RFID (Radio Frequency Identification) read/write module or as a Bluetooth module.

The device may also have preferably an LAN/WLAN module for communication with a local network. A GPS module may be integrated in the device for determining the location.

The user identification means is preferably a cell phone or a chip card, such as an RFID chip card or NFC chip card.

Particularly preferably, the device is a meter, in particular a volumetric flow meter, wherein the data processing module is designed to determine, from the metering signal generated by the metering module, the consumption variable in the form of a consumption quantity or a state variable and to transmit it directly via the first communication connection to the central collection unit in the form of a cloud server, i.e. without local server.

In accordance with the invention, the components separated according to the prior art, i.e. consumption/state metering on the one hand and data processing and transmission on the other, are integrated in a single device with an internal voltage supply with direct cloud link.

A particularly preferred embodiment provides that the metering module is designed to record the consumption variable in the form of a consumption quantity or a state variable and is in particular a device from the group comprising at least a flow meter, a temperature meter, a current meter, a light meter, a pressure meter or a sound meter.

The metering module preferably comprises a sensor module integrated in a housing of the device in the form of a magnetic, current, light, pressure or sound sensor for direct recording of the consumption variable.

Additionally to the sensor module, the metering module may have a recording module for indirect recording of the consumption variable, wherein the recording module is arranged, together with the sensor module, in the housing of the device as an integral part of the latter, or wherein the recording module is an external module which is coupled preferably wirelessly to the sensor module, in particular magnetically, optically or by radio, and is detachably connectable to a housing of the device. The device may therefore be used in combination with a plurality of recording modules.

The recording module is designed to record a physical variable from the group comprising at least flow, temperature, current, light, time, mass, pressure or length and may preferably be a turbine wheel flow meter with a turbine wheel having a magnet, an oval wheel meter with an oval gear having a magnet, a temperature sensor, a current sensor, a light sensor or a pressure sensor.

A further preferred embodiment form provides that the device has a connection module via which external power modules are operable and/or external metering modules are evaluable, wherein the connection module is in particular an optical, electrical, magnetic and/or electromagnetic interface.

Particularly preferably, the device is an automatic fuel terminal, wherein the power module is a pump for providing/dispensing a fluid, wherein the connection module is preferably connected to a control input of the pump, wherein a fluid inlet of the pump is coupled fluidically to a fluid contained in a reservoir such as a tank, wherein a fluid outlet of the pump is connected to an input of the recording module in the form of a turbine wheel flow meter or oval wheel meter, and wherein the point of consumption is couplable to an output of the recording module.

Furthermore, the invention relates to a method for recording a consumption variable supplied to/provided at a point of consumption, comprising the following steps:

Establishing of a wireless communication connection between a data processing module and a user identification means of a user, Authentication of the user by verification of the correct identity of the user, Starting the provision of the consumption variable at the point of consumption, automatically or by the user, Ending the provision of the consumption variable, automatically or by the user, Transmission of consumption-related data relating to the dispensing of the consumption quantity from the dispensing unit to a central and remote collection unit:

If necessary, storage of the consumption-related data by the central and remote collection unit.

Further details, advantages and features of the invention can be gathered not only from the claims and from the features to be found therein—singly and/or in combination—but also from the following description of preferred examples shown in the drawing.

THE DRAWING SHOWS IN

FIG. 1 a block diagram of a device in accordance with the invention and

Figure 2:
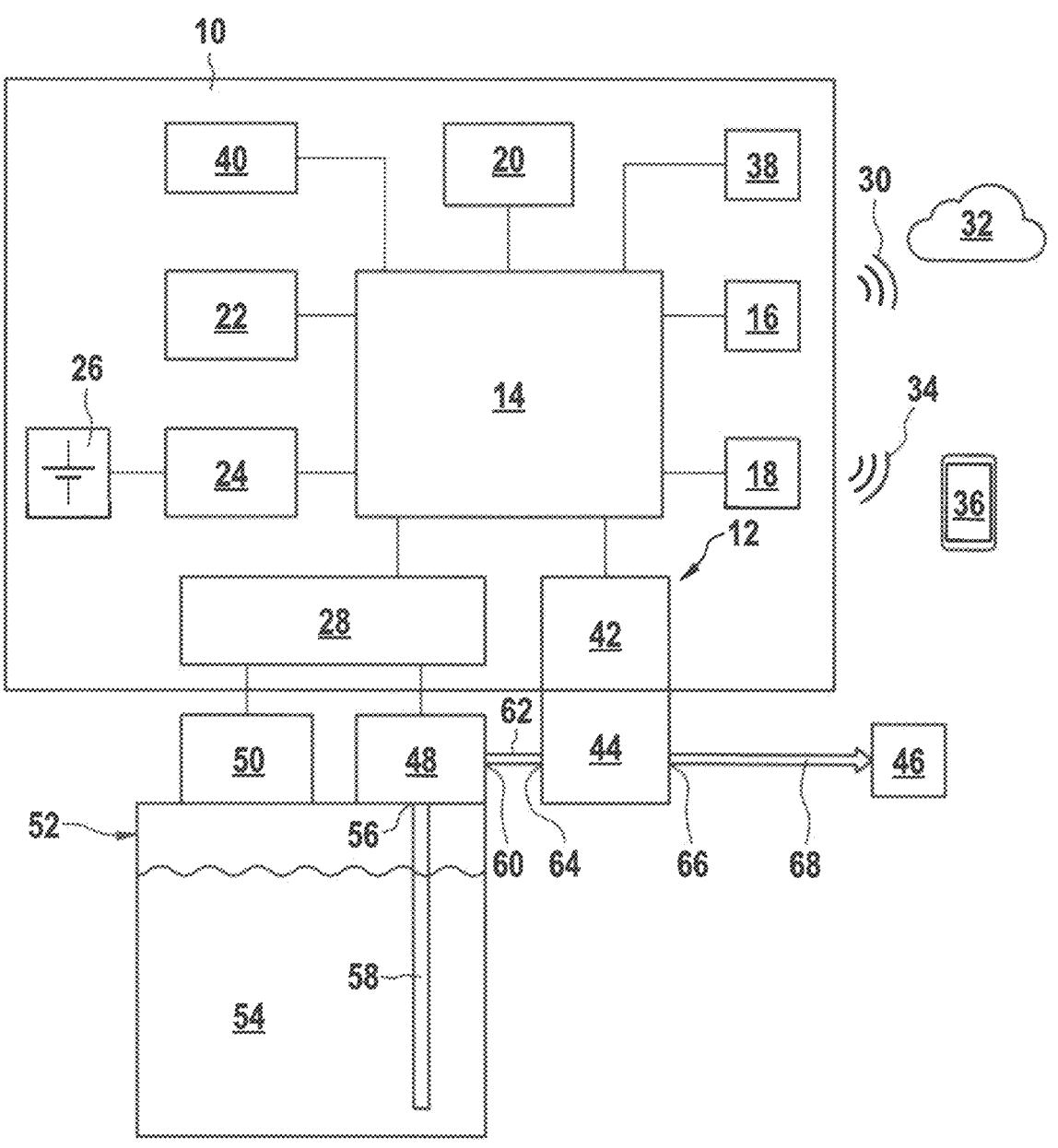

FIG. 2 a block diagram of the device in accordance with the invention with external components for dispensing and metering a consumption quantity supplied to a point of consumption.

FIG. 1 shows purely schematically a block diagram of a device 10 with a metering module 12 for metering a consumption quantity, for example a fuel, supplied to a point of consumption such as a motor vehicle fuel tank. The device 10 further comprises a data processing module 14, a first communication module 16, a second communication module 18, a display and operating unit 20, an authentication module 22, a power supply module 24 with battery module 26 and if necessary a connection module 28.

The first communication module 16 is designed to enable a direct connection of the device 10 to a central collection unit 32 via a first communication connection 30. The central collection unit 32 is a cloud server on which a software application is implemented for recording and processing user data and user-specific consumption data and for controlling the device. The link is achieved using the LPWA (Low Power Wide Area) radio standard, which is distinguished by a low power consumption and low material costs for the required communication modules, among other things. The greatest coverage is achieved using the standards NB-IoT and LTE-M.

The second communication module 18 is designed to establish a wireless near field communication connection 34 to a mobile user identification means 36, such as a cell phone or RFID card. When the mobile user identification means 36 approaches the second communication module 18, a data exchange takes place, wherein user data of the user is transmitted to the data processing module 14. The user data is verified in the authentication module 22 and assigned to a user account. Release of the consumption quantity may take place once verification of the user is completed by a user input by means of the display and operating unit 20 or by time control.

In accordance with the invention, the data processing module 14 is designed such that the metering signal received from the metering module 12 is evaluated and converted into a consumption quantity. Further, the read-off user data and the consumption variable dispensed to the verified user and metered by the metering module 12 in the form of a consumption quantity or a state variable, such as pressure, are transmitted to the central collection unit 32, for example a cloud server, via the first communication module 16 and assigned and charged to the user account of the user. In addition, the consumption quantity or the provision of the state variable and if necessary a corresponding amount of money may be calculated and displayed on the display unit 20.

Additionally, the device 10 may have an LAN/WLAN module 38 or a GPS module 40.

Preferably, the metering module 12 comprises a sensor module 42 integrated in a housing of the device 10 in the form of a magnetic, current, light, pressure or sound sensor for direct recording of the consumption variable.

Alternatively, the metering module 12 may have a recording module 44, 44' coupled to the sensor module 42 for indirect recording of the consumption variable, wherein the recording module 44' together with the sensor module 40 is arranged in the housing of the device 10 as an integral part of the latter or wherein the recording module 44 is an external module which is coupled to the sensor module 42 preferably wirelessly, in particular magnetically, optically or by radio, and is detachably connectable to the housing of the device 10. The device may therefore be used in combination with a plurality of recording modules.

FIG. 2 shows the device 10 in the form of a automatic fuel terminal for dispensing and metering a consumption quantity supplied to a point of consumption 46, such as the fuel tank of a motor vehicle.

In the example shown, the metering module 12 comprises the internal sensor module 42 in the form of a magnetic sensor and the external recording module 44 in the form of a turbine wheel flow metering tube, wherein a turbine wheel having a magnet is rotatably mounted inside the metering tube, and wherein the magnet is coupled to the sensor module 42 magnetically and its revolutions are recorded and counted by means of the sensor module 42. The recording module 44 is connected to the housing of the device 10, as is known per se from EP 3 196 600 A1.

A power component in the form of a pump 48 and a sensor component in the form of a level meter 50 are connected to the connection module 28.

The pump 48 and the level meter 50 are mounted on a container 52, such as a tank, in which a fluid 54, such as fuel, is contained. A fluid inlet 56 of the pump 48 is coupled fluidically via a supply pipe 58 to the fluid 54 and a fluid outlet 60 of the pump 48 is connected via a pipe 62 to an input 64 of the recording module 44, wherein an outlet 66 of the recording module 44 is couplable to the consumption point 46 via a fluid connection 68 such as a pipe or tube.

When the user identification means 36 approaches the second communication module 18, the user data is transmitted. After identification of the user, a release of the pump 48 and the start of dispensing the consumption quantity takes place either after a time has elapsed or by a user input. Dispensing is ended by a user input or by a time-out function, which is for example settable via the central collection unit (cloud server).

The device 10 in accordance with the invention differs from the prior art in that the individual and spatially separate components. i.e. the volumetric flow meter and automatic fuel terminal with data processing and transmission according to the prior art, are combined in a single device with integrated volume flow measurement and direct data transmission to a cloud server.

The invention claimed is:

1. A volumetric flow meter for recording a consumption variable in a form of a consumption quantity of a flow, a heat, or an electric power supplied to a point of consumption, comprising:
   a data processing module;
   a metering module coupled to the data processing module;
   a near field communication module coupled to the data processing module, and in wireless communication with a user identification means;
   an authentication module coupled to the data processing module;
   a Low Power Wide Area (LPWA) standard communication module in communication with a remote and central collection unit in a form of a cloud server, via a wireless LPWA communication connection;
   a power supply module connected to the metering module, the data processing module, and the LPWA standard communication module; and
   a battery connected to the power supply module;
   wherein the volumetric flow meter:
   establishes a wireless near field communication connection by using the near field communication module between the data processing module and the user identification means of the user;
   authenticates the user by verifying an identity of the user;
   starts the provision of the consumption variable at the point of consumption, automatically, or by the user;
   records the consumption variable provided to the user by using the metering module, and assigning the recorded consumption variable to an account of the user using the data processing module;
   ends the provision of the consumption variable, automatically, or by the user; and
   transmits consumption-related data relating to the provision of the consumption variable from the data processing module to the central and remote collection unit in the form of the cloud server directly, without a local server, by means of the Low Power Wide Area (LPWA) standard communication module via the wireless LPWA communication connection;
   stores the consumption-related data by the central and remote collection unit;
   wherein the data processing module, the LPWA standard communication module and the metering module are supplied with current via the power supply module, and wherein the power supply module is supplied with power by the battery.

2. The meter according to claim 1, wherein the LPWA standard communication module permits communication via NB-IoT or LTE-M standards.

3. The meter according to claim 1, wherein the near field communication module is an NFC (Near Field Communication) module, an RFID (Radio Frequency Identification) read/write module, or a Bluetooth® module.

4. The meter according to claim 1, further comprising a LAN/WLAN module and/or a GPS module.

5. The meter according to claim 1, wherein the user identification means is a cell phone or a chip card.

6. The meter according to claim 1, wherein the data processing module calculates a consumption quantity from the metering signal of the consumption variable generated by the metering module.

7. The meter according to claim 1, wherein the metering module has a sensor module integrated in a housing of the meter in a form of a magnetic, current, light, pressure, or sound sensor.

8. The meter according to claim 1, wherein the metering module further comprises a recording module, wherein the recording module and the sensor module are arranged in a housing of the meter, or wherein the recording module is an external module which is coupled to the sensor module wirelessly, and is detachably connectable to the housing of the meter.

9. The meter according to claim 8, wherein the recording module is a turbine wheel flow meter with a turbine wheel having a magnet, an oval wheel meter with an oval gear having a magnet, a temperature sensor, or a current sensor.

10. The meter according to claim 1, further comprising a connection module coupled to at least one of an external power module and an external metering module, wherein the connection module is an optical, electrical, magnetic and/or an electromagnetic interface.

11. The meter according to claim 10, wherein the meter is an automatic fuel terminal, wherein the external power module is a pump, wherein the connection module is connected to a control input of the pump, wherein a fluid inlet of the pump is coupled fluidically to a fluid contained in a reservoir in a form of a tank, wherein a fluid outlet of the pump is connected to an input of the recording module in a form of a flow meter, and wherein an output of the recording module is coupled to the point of consumption in a form of a fuel tank of a motor vehicle.

12. A method for recording a consumption variable in a form of a consumption quantity of a flow, a heat, or an electric power supplied to a point of consumption by means of a volumetric flow meter, comprising: establishing a wireless near field communication connection by using a near field communication module between a data processing module and a user identification means of a user; authenticating the user by verifying an identity of the user; starting the provision of the consumption variable at the point of consumption, automatically, or by the user; recording the consumption variable provided to the user by using a metering module selected from the group consisting of a flow meter, a temperature meter, and a current meter, and assigning the recorded consumption variable to an account of the user using the data processing module; ending the provision of the consumption variable, automatically, or by the user; transmitting consumption-related data relating to the provision of the consumption variable from the data processing module to a central and remote collection unit in the form of a cloud server directly, without a local server, by means of a Low Power Wide Area (LPWA) standard communication module via a wireless LPWA communication connection; storing the consumption-related data by the central and remote collection unit; wherein the data processing module, the LPWA standard communication module and the metering module are supplied with current via a power supply module, and wherein the power supply module is supplied with power by a battery.

13. The meter according to claim 5, wherein the chip card is an RFID chip card or an NFC chip card.

* * * * *